US008675377B2

(12) United States Patent
Thomas et al.

(10) Patent No.: US 8,675,377 B2
(45) Date of Patent: Mar. 18, 2014

(54) ARCHITECTURE OF A COMPENSATOR FOR POWER FACTORS AND HARMONICS FOR A POWER DISTRIBUTION SYSTEM

(75) Inventors: Philippe Thomas, Plougonvelin (FR); Philippe Le Bas, Brest (FR); Philippe Cussac, Albi (FR); Henri Foch, Saint Orens de Gameville (FR); Didier Ferrer, Ramonville Saint Agne (FR); Aymeric Lacoste, Toulouse (FR)

(73) Assignee: Thales, Neuilly sur Seine (FR)

( * ) Notice: Subject to any disclaimer, the term of this patent is extended or adjusted under 35 U.S.C. 154(b) by 47 days.

(21) Appl. No.: 13/383,199

(22) PCT Filed: Jul. 8, 2010

(86) PCT No.: PCT/EP2010/059814
§ 371 (c)(1),
(2), (4) Date: Mar. 14, 2012

(87) PCT Pub. No.: WO2011/003975
PCT Pub. Date: Jan. 13, 2011

(65) Prior Publication Data
US 2012/0195077 A1    Aug. 2, 2012

(30) Foreign Application Priority Data

Jul. 10, 2009 (FR) ...................................... 09 03429

(51) Int. Cl.
*H02M 1/12* (2006.01)
*G05F 1/613* (2006.01)
(52) U.S. Cl.
USPC ........................................... 363/44; 323/223
(58) Field of Classification Search
USPC ................................ 363/22, 24, 44; 323/223
See application file for complete search history.

(56) References Cited

U.S. PATENT DOCUMENTS

| | | | | |
|---|---|---|---|---|
| 5,600,549 A * | 2/1997 | Cross | | 363/46 |
| 6,903,536 B2 * | 6/2005 | Yang | | 323/266 |
| 7,092,266 B2 * | 8/2006 | Frank | | 363/65 |
| 7,176,660 B2 * | 2/2007 | Usui et al. | | 323/207 |
| 7,489,532 B2 * | 2/2009 | Shih | | 363/89 |
| 2009/0027931 A1 | 1/2009 | Usui et al. | | |
| 2011/0095734 A1 * | 4/2011 | Orr et al. | | 323/207 |

FOREIGN PATENT DOCUMENTS

FR    2895167 A1    6/2007

OTHER PUBLICATIONS

Pacheco, Vinicius M., et al., "An On Line No-Break with Power Factor Correction and Output Voltage Stabilization", INTELEC 2002, 24th Int'l Telecommunications Energy Conf., Montreal, Quebec, Canada, Sep. 29-Oct. 3, 2002.

* cited by examiner

*Primary Examiner* — Adolf Berhane
*Assistant Examiner* — Emily P Pham
(74) *Attorney, Agent, or Firm* — Baker & Hostetler LLP

(57) ABSTRACT

A rectifier system for a primary AC electrical power distribution system comprising a PFC circuit connected onto the primary distribution system which delivers a DC power supply and means for storing electrical energy connected to the outputs of the PFC via a switching circuit. This circuit is controlled in such a manner as to effect either the discharge of the electrical energy stored in the storage means onto the DC power supply line, or the charging of the storage means by the DC power supply line. A first control circuit determines the state of operation of the switching circuit by comparing the value of the voltage on the power supply line with a first reference voltage. A second control circuit regulates the power delivered by the PFC over the power supply line by comparing the voltage present at the output of the storage means with a second reference voltage.

10 Claims, 4 Drawing Sheets

ARCHITECTURE OF A COMPENSATOR FOR POWER FACTORS AND HARMONICS FOR A POWER DISTRIBUTION SYSTEM

CROSS-REFERENCE TO RELATED APPLICATIONS

This application is a National Stage of International patent application PCT/EP2010/059814, filed on Jul. 8, 2010, which claims priority to foreign French patent application No. FR 09 03429, filed on Jul. 10, 2009, the disclosures of each of which are incorporated by reference in their entireties.

The invention relates to the general field of high-power electrical systems connected to power distribution systems. It more particularly relates to the devices responsible for compensating the variations in load which an electrical power distribution system has to handle mainly when the load varies rapidly. It is particularly adapted to systems designed to power pulsed loads.

BACKGROUND

An electrical power distribution system is generally composed of a distribution line onto which equipment is connected whose power is supplied by the distribution system, and which "load" the distribution system to a greater or lesser extent depending on the value of the impedance that they present. It also comprises means for producing the electrical power delivered together with control means that act on the electrical power production means in such a manner that the electrical power produced is, at any given moment, as adapted as possible to the load imposed by the equipment installed on the power supply line.

The distribution system is generally configured and dimensioned so that, in nominal operating mode and taking into account slow variations in load, it is able to deliver, with a certain safety margin, the electrical power demanded by the totality of the connected equipment. In other words, these means are dimensioned for delivering a given average power, while accepting to a certain extent variations around this average value of delivered power, which variations are preferably small and slow. For this reason, it is often necessary to insert, between the applied load and the distribution system, a device capable of detecting the variations in this load and of reacting to these variations by acting in such a manner as to limit their impact, or even by supplying the totality of the additional power demand using, for this purpose, an energy storage device.

In order to provide the power supply from an AC distribution system for high-power equipment, as illustrated in FIG. 1, a structure comprising a device commonly called a PFC, an acronym for the expression "Power Factor Corrector", is generally inserted. This device, of structure known from elsewhere, carries out the conversion of the AC current supplied by the AC distribution system into DC current. This type of device mainly comprises AC-DC conversion means, together with means for the closed-loop control of the DC voltage produced to a given setpoint value which corresponds to the supply voltage required by the connected equipment. In this way, a variation in the load of this equipment normally causes an increase in the current produced by the PFC which then absorbs a higher power on the distribution system.

The PFC is generally associated with a set of means forming a feedback chain whose role is to detect the variations in load presented by the equipment connected to the distribution system, which variations in load result in a drop in the DC voltage delivered to the equipment. When such a voltage drop is detected, the means composing the feedback chain act on the PFC in such a manner that the latter delivers a DC current responding to the current demand induced by the variation in load.

One known drawback of the devices of the PFC type is that they necessarily have a relatively long reaction time, in order notably to preserve the quality of the primary AC distribution system (voltage dip and harmonics), which distribution system is generally powered by means incapable, by nature, of rapidly handling an increase in the power demand. The PFC therefore comprises a slow voltage feedback control loop, whose cutoff frequency is much lower than the frequency of the distribution system, so that it is able to absorb on the primary an AC current in phase with the voltage, and comprising the fewest possible harmonics.

The low bandwidth of the closed-loop control of the PFC therefore limits the quality of the regulation of the DC voltage when faced with rapid variations in load, and in particular in the case of a load of a pulsed nature. Thus, in order to respond to an abrupt variation in the load presented by the equipment connected to the distribution system, complementary means need to be provided capable of overcoming during a relatively long interval of time the incapacity of the PFC to deliver the necessary power.

These complementary means are generally means capable of storing and of returning electrical power, mainly banks of accumulators or capacitors. These energy storage means here are dimensioned so as to ensure a complementary provision of power during the interval of time necessary for the PFC to be able to handle the additional power demand from the equipment and to maintain a satisfactory power supply for the equipment despite the variation in load.

In practice, as illustrated in FIG. 1, such a structure is known which associates energy storage means with the PFC using a device of the chopper type. The chopper circuit here is designed to alternately adopt two states of operation: a first state in which it is configured for discharging the electrical power stored in the storage means on the DC line that supplies the equipment connected to the distribution system, and a second state in which it is configured for recharging storage means using the electrical current produced by the PFC.

According to this known embodiment, the passage from one state to the other is directly controlled by the state of operation of the PFC. Thus, when the PFC finds itself, at a given moment in time, incapable of producing the necessary power, the chopper is controlled in such a manner as to discharge the energy storage means such that the latter provide a complementary current on the power supply line which will be added to the current produced by the PFC in order to supply the equipment with the required power. Similarly, when the PFC is capable of supplying a power higher than the power demand, the chopper is controlled in such a manner as to recharge the energy storage means. The control of the chopper 16 is generally based on information directly supplied by the PFC, which indicates that the current supplied by the PFC is sufficient or otherwise in order to power the equipment correctly.

However, given that the process of regulation of the output power by the PFC is a slow process, an abrupt variation imposed on the load is only taken into account by the PFC after a relatively long lapse of time. Consequently, during a given lapse of time that follows the moment in time corresponding to an abrupt variation in the load, the PFC 11 shows no reaction such that, since the chopper 16 is not controlled so as to discharge the storage means, there occurs a deficit in the power supplied which results in a drop in the voltage delivered.

This known embodiment finally leads to a distribution system being obtained whose power exhibits an insufficient regulation, in particular when faced with abrupt and large variations in load, capable of having a significant effect on the operation of the equipment being powered.

SUMMARY

One aim of the invention is to provide a structure based on a PFC that allows a distribution system to be obtained for the distribution of power in the form of DC current, capable of supplying in a satisfactory manner a unit of equipment imposing abrupt and large variations in load (i.e. in power consumption), in other words a structure having a response to these variations that is substantially faster than the known structures whose principle was previously described.

For this purpose, the subject of the invention is a rectifier system for a primary AC electrical power distribution system with compensation of the power factor and of the harmonic content. The device according to the invention comprises at least one PFC circuit connected onto the primary distribution system and delivering a DC power supply over a DC power supply line and means for storage and for return of electrical energy, connected to the DC power supply line via a switching circuit. This switching circuit is configured to have two states of operation, a first state of operation in which it effects the discharge over the DC power supply line of the electrical energy stored in the storage means and a second state of operation in which it effects the charging of the storage means via the DC power supply line. The device according to the invention furthermore comprises two crossed control circuits:

a first control circuit that determines the state of operation of the switching circuit by comparison of the value of the voltage on the power supply line with a first reference voltage, the switching circuit being positioned in the first state of operation if the voltage on the power supply line is lower than the first reference voltage and in the second state of operation in the opposite case, a second control circuit that regulates the power delivered by the PFC on the power supply line as a function of the voltage present at the output of the storage means, by comparison of this voltage with a second reference voltage.

In one preferred embodiment of the system according to the invention, since the operating voltage of the means for storing electrical energy is substantially lower than the electrical voltage delivered by the power supply line, the switching circuit is a reversible chopper circuit which raises the electrical voltage delivered by the storage means when the latter are discharged over the power supply line and which lower the voltage of the electrical current taken from the power supply line when the storage means are recharged by the power supply line.

In one particular embodiment of the system according to the invention, the energy storage means comprise a bank of accumulators.

In another particular embodiment of the system according to the invention, the energy storage means comprise a bank of capacitors.

In one preferred embodiment of the system according to the invention, the first and the second control circuit comprise an integrating amplifier (PI) which integrates the variation in the voltage measured with respect to the reference voltage.

In one particular embodiment of the system according to the invention, the second control circuit furthermore comprises a filtering circuit configured for limiting the bandwidth of the control loop of the PFC.

Another subject of the invention is a secondary AC electrical power distribution system with improved load factor and harmonic content, which comprises a rectifier system according to the invention and an inverter circuit installed at the output of said rectifier system.

According to the invention, the inverter circuit is a controlled inverter circuit, configured for delivering pulses of AC current under the action of a chopping control.

In one variant embodiment of the secondary AC electrical power distribution system according to the invention, the inverter circuit is a multi-level inverter circuit.

In another variant embodiment of the secondary AC electrical power distribution system according to the invention, the inverter circuit is a multi-phase inverter circuit.

BRIEF DESCRIPTION OF THE DRAWINGS

The features and advantages of the invention will be better appreciated thanks to the description that follows, which description presents the principle of the invention with reference to the appended figures which show.

DETAILED DESCRIPTION

Figure 1:
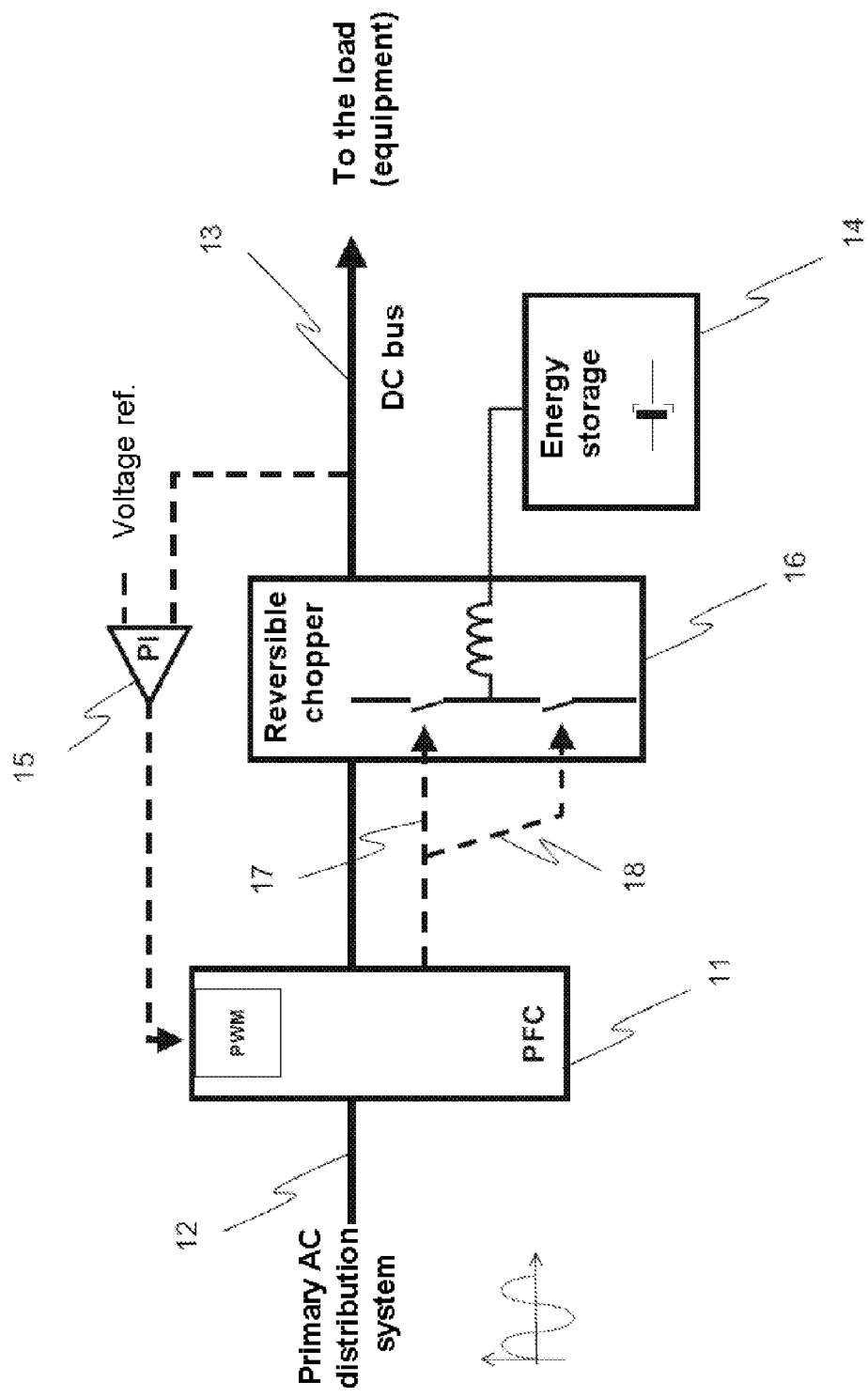
FIG. 1, a schematic circuit diagram of the typical structure according to the known prior art of a DC electrical power production and distribution system built around a PFC, FIG. 2, a schematic circuit diagram of the typical structure according to the invention of a DC electrical power production and distribution system built around a PFC.

As has previously been said, FIG. 1 is a schematic representation of the general structure of a known regulation system designed to be installed on the electrical power distribution system and whose main function is both to allow the power and harmonic factor of the electrical current delivered by the primary distribution system to be improved and to provide a continual adaptation to the power demand of the power delivered to the distribution system.

This known structure incorporates a device 11 called PFC according to the acronym for "Power Factor Corrector". The PFC is powered at its input by the primary AC power distribution system 12, and delivers at its output a DC electrical power supply 13, which can be used to produce an AC voltage.

The internal structure of a PFC, known from elsewhere, is not described here. It will just be recalled that the PFC is a device comprising internally controlled feedback control loops whose role is to switch reactive elements onto the power supply line in such a manner as to regulate the power factor of the distribution system as a function of the imposed load. Generally speaking, it also comprises a control input allowing it to be operated, as illustrated in FIG. 1, in a configuration comprising an external regulation loop taking into account the voltage of the power supply delivered 13. In the illustration of FIG. 1, the external control is formed by the signal produced by a proportional integrator PI 15 on the inputs, from which are applied a reference voltage and the supply voltage delivered 13.

As has previously been said, the reaction speed of the PFC to a variation in the nature of the load imposed on the distribution system is slow, this slowness resulting from the necessity for limiting the harmonic content produced on the distribution system. For this reason, it is a question of a regulation of the power supply delivered rather than of a closed-loop control. In practice, the bandwidth of the feedback chain of the PFC is much lower than the frequency of the distribution system, a 50 Hz AC distribution system for example, onto which it is inserted. As has also previously been said, this feature has the consequence that the PFC does not allow a correct regulation of the power delivered by the distribution system on the distribution line 13, downstream of the PFC. In particular, in the case of an abrupt and large variation in the load imposed on the distribution system, it proves to be impossible to instantaneously supply the power demanded by the equipment responsible for this abrupt variation. This impossibility results, over a given lapse of time, in a temporary voltage drop which can cause a incorrect operation of the equipment during this lapse of time.

In order to overcome this drawback, as has previously been said, a known solution is to associate the PFC with energy storage means 14 dimensioned so as to supply a complementary power over the distribution system, downstream of the PFC, over the periods of operation during which the PFC does not supply the totality of the power demand. These means are coupled to the power distribution line 13 via a chopper device 16 which alternatively presents two states of operation:

a first state where it discharges the reserve of energy stored in the means 14 over the line 13, the current delivered by these means being added to the current produced by the PFC 11;

a second state where it recharges the means 14 with electrical energy.

The control of the state of operation of the chopper 16 is generally carried out, as illustrated by the arrows 17 and 18 in FIG. 1, based on information relating to the state of operation of the PFC 11. This information can for example be deduced from the value of a setpoint voltage measured on the regulation loops for the current delivered from the PFC, a voltage which in principle varies slowly in a PFC.

Thus, if the PFC is in a state in which it cannot supply the totality of the power demand, the chopper 16 is placed in the first state. Conversely, if the PFC is in a state in which it can supply a power higher than the power demand, the chopper 16 is placed in the second state.

As is illustrated in FIG. 1, this known regulation structure for the load factor and harmonic content, a simple structure widely implemented, thus has two independent control circuits 15 and 17-18.

The first control circuit 15, for regulation, acts on the PFC 11 in such a manner that the latter adapts its operation so as to supply the power demand and to avoid the drop in the voltage delivered to the equipment being supplied. Owing to the low bandwidth of the regulation loops of the PFC, the reactivity of this first circuit is slow and the modification of the operation of the PFC is only effective after a lapse of time whose duration is a function of the bandwidth.

As far as the second control circuit 17, 18 is concerned, this acts on the chopper 16 in such a manner as to effect the discharge or the charging of the energy storage means 14 depending on the information transmitted by the PFC 11, the order to discharge the energy reserve only being given to the chopper when the PFC has begun to react to the imposed abrupt variation in the load and to an increase in the supplied power demand.

As a result, owing to the reaction slowness of the PFC 11, an imposed abrupt variation in the load does not instantaneously result in the state of operation of the chopper 16 being switched to the state of operation corresponding to a discharge onto the distribution system of the energy stored in the storage means 14. As a consequence, no power contribution is as yet forthcoming and the fall in voltage continues for as long as the PFC does not show any reaction to this voltage drop.

A flawed regulation of the power delivered onto the distribution system is thus obtained, in particular during abrupt and large variations in the load imposed on the distribution system. This known and widely implemented structure does not therefore allow both a satisfactory regulation of the power factor and of the harmonic content to be obtained and a totally effective regulation of the power delivered by the distribution system to be operated.

Figure 2:
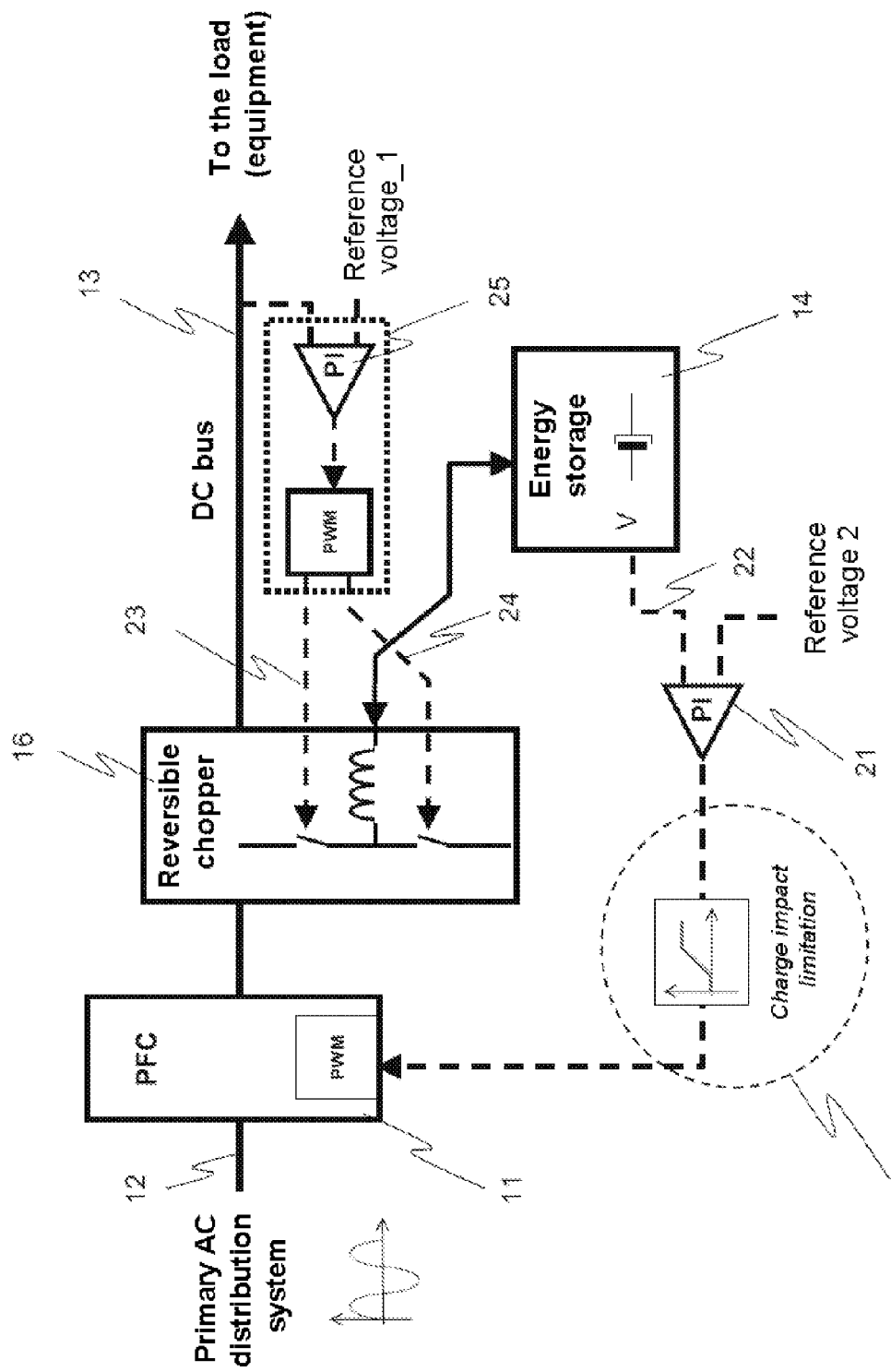

FIG. 2 is a schematic representation of the general structure of the regulation system according to the invention.

The main aim of the device illustrated here is to fulfill the same objectives as the known system illustrated in FIG. 1. To this effect, it comprises the same elements. It thus comprises a PFC 11 installed on the main distribution system and means for storing electrical energy 14 connected to the power supply line 13 downstream of the PFC with respect to the primary power source, an AC single or three-phase distribution system for example. According to the invention, the energy storage means 14 can for example consist of a bank of accumulators or capacitors.

As for the system described previously, the energy storage means 14 are connected to the power supply line 13 via of a controlled chopper circuit 16 which, depending on the value of the control command applied to it, ensures the discharging of means for storing electrical energy 14 onto the power supply line 13 or else the recharging of the same storage means 14 using the electrical current flowing on this same line 13. The chopper 16 also ensures the raising of the voltage produced by the storage means 14 up to the nominal value of the voltage delivered by the power supply line 13 during the discharge operation and the lowering of the voltage from the power supply line down to the nominal voltage of the storage means 14 during the operation for recharging of these means.

The system according to the invention also comprises, like the known system, two control and regulation circuits, one of the circuits being designed to operate a closed-loop control of the PFC onto the voltage delivered and the other circuit being designed to perform the selection of the state of operation, discharge or charging of the storage means 14, of the chopper circuit 16. However, as opposed to the known system described previously, the closed-loop control of the PFC is not directly carried out using the value of the voltage measured on the power supply line 13, but on the value of the voltage present at the output of the energy storage means 14. Similarly, as opposed to the known system described previously, the control of the chopper circuit is not directly produced by the PFC or deduced from the state of operation of the PFC, but directly synthesized from the voltage delivered on the power supply line 13. In this way, as opposed to what occurs in the system described previously, the complementary provision of power by the energy storage means 14 can advantageously be applied instantaneously as soon as the voltage of the power supply line 13 starts to fall, without waiting for any kind of reaction from the PFC.

According to the invention, the control circuits of the PFC 11 and of the chopper 16 have a similar conventional structure centered around an integrating amplifier or "PI" which measures the difference between a measured voltage, the voltage on the power supply line for the PI 25 of the control circuit of the chopper 16 and the voltage delivered by the storage means 14 for the PI 21 of the control circuit of the PFC, and a reference voltage of suitable value forming the value of the regulation voltage. According to the invention, each integrating amplifier PI is associated with switching electronics suitable for the operation of the controlled circuit (PFC or chopper). This switching electronics is symbolized by the boxes entitled "PWM" in FIG. 3 (PWM is the acronym for the expression "pulse width modulator").

Figure 3:
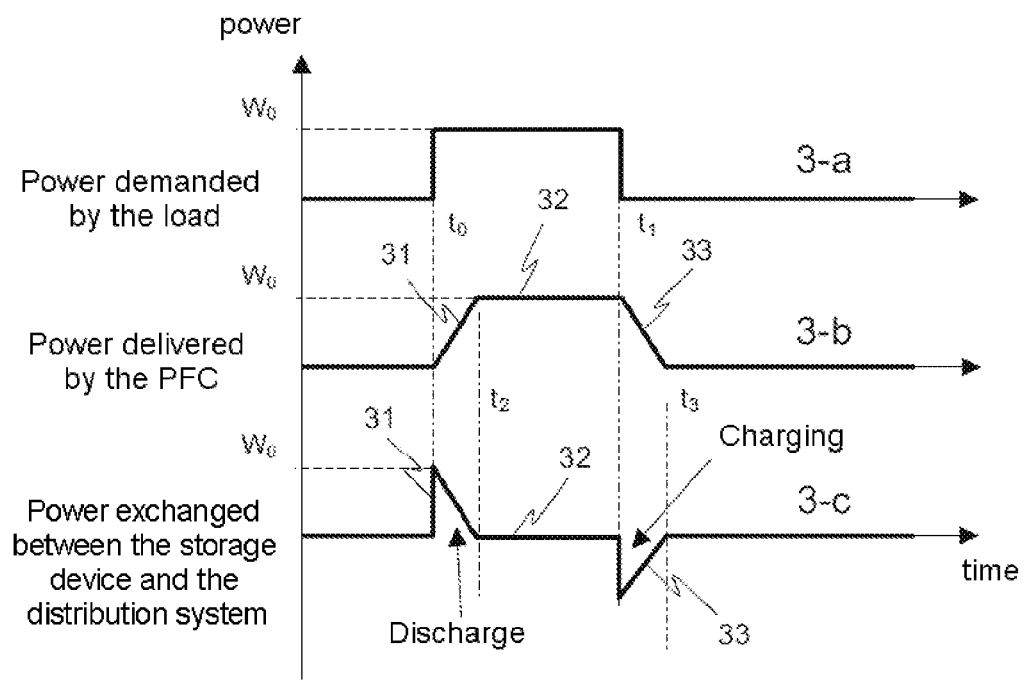
FIG. 3, an overall timing diagram illustrating the states of operation of the structure according to the invention.

The example in FIG. 3 highlights the particularly advantageous nature, in terms of regulation of the delivered power, of the system according to the invention. It also highlights the various phases of operation of the system.

In the example illustrated here, the equipment supplied by the power distribution system is equipment whose power consumption is described by the timing diagram 3-$a$. Such equipment exhibits periods of activity of a given duration $\Delta t = t_1 - t_0$ during which it consumes a power of constant significant value, separated by intervals of time of variable length during which it does not consume power or a power of insignificant value. The load imposed on the distribution system by such equipment therefore appears as varying abruptly.

The timing diagram 3-$b$ shows the evolution of the power delivered by the PFC in such a case of operation. It can be observed that in such a circumstance, the response of the PFC to the abrupt variation in the power demand, owing to the slowness of reaction of the latter, exhibits three phases of operation:

a first phase 31 which runs from time $t_0$ to a time $t_2$ during which the power delivered by the PFC 11 increases regularly to reach the demand value. During this phase, in the absence of supplementary means, there will be a deficit in the power delivered to the equipment;

a second phase 32 which runs from time $t_2$ to a time $t_1$ during which the PFC continuously delivers the power demand. During this phase, the PFC delivers the power demand on its own;

a third phase 33 which runs from time $t_1$ to a time $t_3$ during which, since the power consumed by the equipment has abruptly become negligible, the PFC progressively reduces the value of the delivered power. During this last phase, the PFC delivers an energy which is not absorbed by the equipment but by the electrical power storage means 14.

The timing diagram 3-$c$ then shows, for the chosen example of equipment, the variation over time of the power exchanged between the energy storage means 14 and the power supply line 13 in the system according to the invention.

As can be observed, this exchange advantageously comprises three phases, synchronous with the phases of operation of the PFC.

During a first phase 31, since the PFC is not able to deliver the power demand, the voltage of the power supply line 13 tends to decrease such that the control circuit of the chopper 16 activates the discharge of the energy storage means. The electrical energy is then transferred from the storage means to the power supply line so as to supplement the PFC. The power transmitted by the storage means regularly decreases during this phase as the power delivered by the PFC increases, until time $t_1$ for which the power transmitted by the storage means becomes negligible, or even zero. At the end of this step, the voltage V delivered by the storage means 14 has dropped to a value substantially lower than its nominal value.

During a second phase 32, the power exchanged between the power supply line 13 and the means for storing electrical energy 14 remains negligible or zero, the power delivered by the PFC then being consumed by the equipment.

During a third phase 33, the power absorbed by the equipment has again abruptly become zero, such that the voltage of the power supply line tends to increase such that the control circuit of the chopper 16 activates the recharging of the energy storage means 14. However, since the voltage delivered by the storage means 14 remains, for a certain time, lower than the nominal value, the control circuit of the PFC acts on the latter in such a manner that it continues to deliver a non-zero electrical power on the line 13, the delivered power decreasing as the voltage across the terminals of the electrical energy storage means 14 tends toward its nominal value. The power delivered by the PFC is then totally transferred to the storage means. Subsequently, when the energy storage means are totally recharged, the control circuit of the PFC halts the power delivery.

Thus, as can be observed from FIG. 3, the system according to the invention advantageously allows the power demanded by the equipment being supplied to be delivered at all times and it does this even though the PFC is not intrinsically capable of instantaneously handling an abrupt and large variation in the power demand. Furthermore, owing to their configurations, the control circuits of the PFC 11 and of the chopper circuit 16 allow the operation of the PFC to be controlled so as to ensure the recharging of the storage means 14 by the latter when the power demanded by the equipment being supplied becomes zero.

It should be noted that the PFC does not itself produce the electrical power delivered over the power supply line 13, the action of the PFC being to regulate the power factor and the harmonic content. The power is taken from a primary power distribution system. In this way, when the secondary distribution system supplied by the PFC exhibits an abrupt variation in power consumption, the power taken by the PFC from the primary distribution system rises as a consequence, however in a less abrupt fashion owing to the slowness of reaction of the PFC. Nevertheless, in the case where the variation of the power consumed is really very large and brief, with respect to the average value supplied by the primary distribution system for example, it can be judicious to provide means for limiting the charge impact on the primary distribution system, in other words the increase in the power absorbed on this distribution system.

Figure 4:
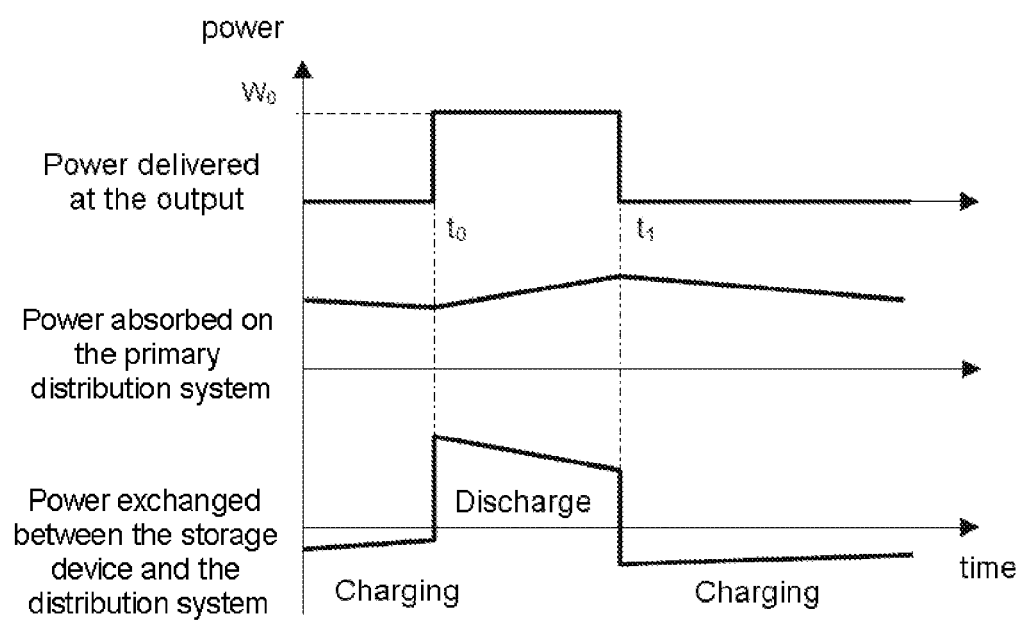
FIG. 4, an overall timing diagram illustrating the states of operation of the structure according to the invention considered in a variant embodiment.

The system according to the invention can advantageously be adapted in a simple fashion so as to comply with this requirement. For this purpose, a filtering device 26 may for example be added to the control circuit of the PFC whose role is precisely to limit the charge impacts, in other words the abrupt variations in the power absorbed by the PFC over the primary distribution system in response to an abrupt variation of the load. However, this filtering device has the effect of slowing even more the response of the PFC to an abrupt increase in the power consumed; it is then necessary to dimension the energy storage means 14 accordingly. An operation of the regulation system according to the invention is then obtained that is close to that illustrated in FIG. 4 for which the majority of the power supplied to the equipment being powered is delivered by the storage means 14. The PFC then, advantageously, only supplies the average value of the power absorbed by the load and does not have to be dimensioned for the peak power supplied by the system.

Figure 5:
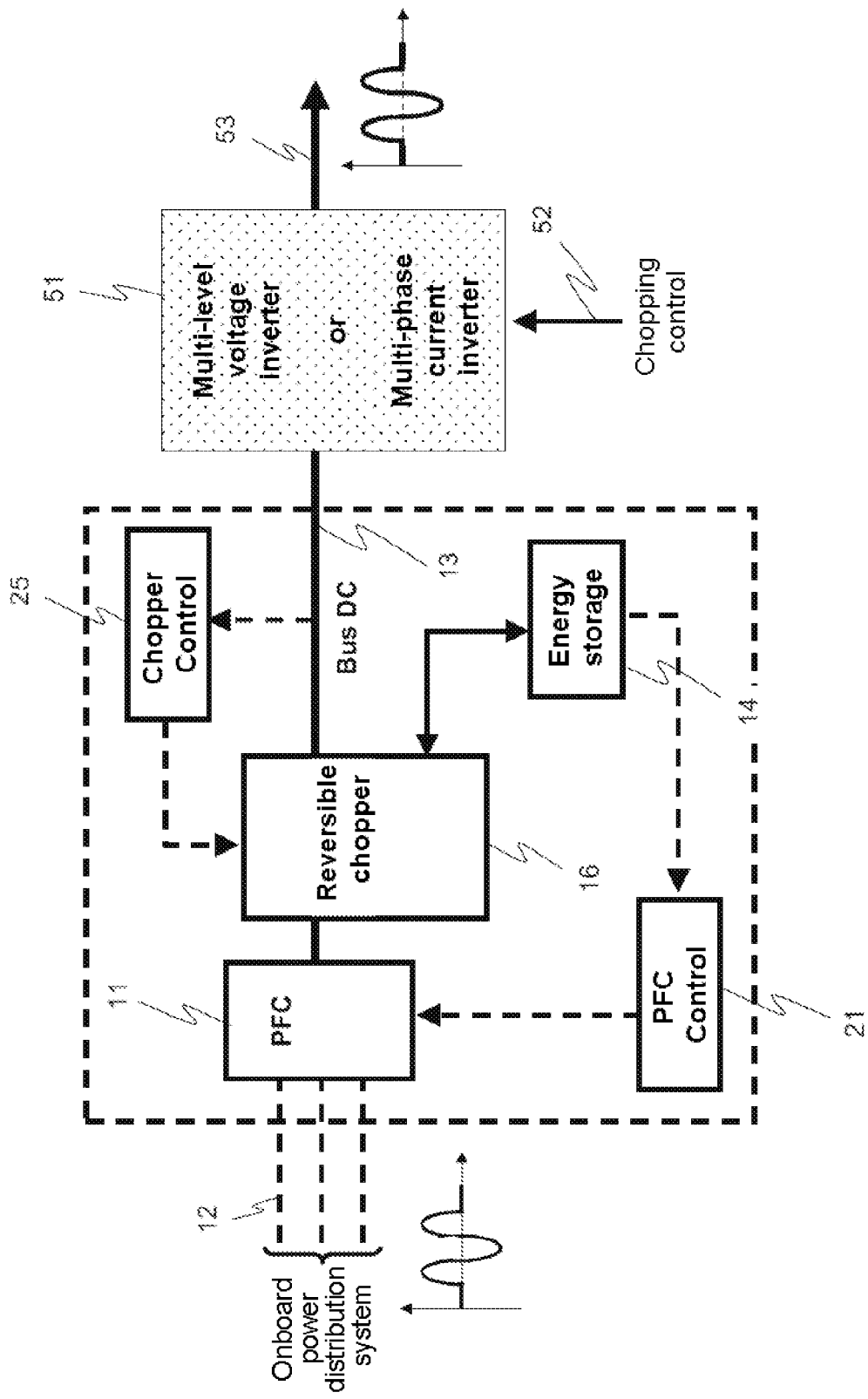
FIG. 5, an exemplary application of the power distribution system structure according to the invention.

The regulation system according to the invention can have many applications, in particular for powering equipment whose correct operation relies on a good control of the supply voltage. FIG. 5 illustrates the application of the system according to the invention to a power distribution system adapted to an acoustic wave transmitter. This application is however presented by way of non-limiting example.

In this application, the system according to the invention powers an inverter circuit 51 configured for converting the DC current delivered by the system over the power supply line 13 into an AC current itself intended to supply a service load via a power supply line 53. The service load can for example consist of a set of sonar transducers, the inverter circuit then being a multi-level inverter, in other words a device composed of several converters used as voltage generators connected in series and whose delivered voltages are summed. Alternatively, the inverter can be a multi-phase inverter, in other words a device composed of several converters used as current generators connected in parallel and whose delivered currents are summed. For this purpose, the inverter is configured for producing an AC current when it is loaded, by means of a modulation or chopping control 52. In this way, a train of sinusoidal waves is produced by the inverter when the latter is activated by the control 52.

The use of the system according to the invention for such a power supply advantageously allows sinusoidal pulses (i.e. trains of sinusoidal waves) to be produced having a very low harmonic content in voltage, while at the same time guaranteeing compliance with the standards in force, in terms of electromagnetic compatibility (EMC) and of limitation of the harmonic content in current produced over the distribution system. It also allows a power supply to be produced capable of delivering high powers abruptly and for a limited time, while at the same time furthermore limiting the corresponding impact of the variations in power absorbed on the primary distribution system, which power of the primary distribution system is naturally limited.

The invention claimed is:

1. A rectifier system of a primary distribution system to distribute AC electrical power, with compensation of a power factor and of a harmonic content, comprising
   at least one PFC circuit connected to the primary distribution system and delivering a DC power supply over a DC power supply line;
   a storage unit to store and provide an electrical power, the storage unit connected to the DC power supply line by a switching circuit configured to have two states of operation, a first state of operation in which the switching circuit controls discharge of the electrical power stored in the storage unit over the DC power supply line, and a second state of operation in which the switching circuit controls charge of the storage unit via the DC power supply line;
   a first control circuit to determine a state of operation of the switching circuit by comparing a voltage on the DC power supply line with a first reference voltage, the switching circuit operates in the first state of operation if the voltage on the DC power supply line is lower than the first reference voltage and in the second state of operation if the voltage on the DC power supply line is equal to or higher than the first reference voltage; and
   a second control circuit to regulate a power delivered by the at least one PFC circuit over the DC power supply line as a function of a voltage present at an output of the storage unit, by comparing the voltage present at the output of the storage unit with a second reference voltage.

2. The system according to claim 1, wherein an operating voltage of the storage unit is substantially lower than the voltage on the DC power supply line, the switching circuit is a reversible chopper circuit to increase the voltage delivered by the storage unit when the storage unit is discharged over the DC power supply line and to decrease the voltage on the DC power supply line when the storage unit is recharged via the DC power supply line.

3. The system according to claim 1 wherein the storage unit comprises a bank of accumulators.

4. The system according to claim 1 wherein the storage unit comprises a bank of capacitors.

5. The system according to claim 1, wherein
   the first control circuit comprises an integrating amplifier to integrate a variation in the voltage on the DC power supply line measured with respect to the first reference voltage, and
   the second control circuit comprises an integrating amplifier to integrate a variation in the voltage present at the output of the storage unit measured with respect to the second reference voltage.

6. The system according to claim 1, wherein the second control circuit furthermore comprises a filtering circuit configured to limit a bandwidth of a control loop of the at least one PFC circuit.

7. A secondary AC electrical power distribution system with improved load factor and harmonic content, comprising a rectifier system according to claim 1 and an inverter circuit installed on the DC power supply line of said rectifier system.

8. The secondary AC electrical power distribution system according to claim 7, wherein the inverter circuit is a controlled inverter circuit configured to provide pulses of AC current in response to a chopping control command.

9. The secondary AC electrical power distribution system according to claim 7, wherein the inverter circuit is a multi-level inverter circuit.

10. The secondary AC electrical power distribution system according to claim 7, wherein the inverter circuit is a multi-phase inverter circuit.

* * * * *

UNITED STATES PATENT AND TRADEMARK OFFICE
CERTIFICATE OF CORRECTION

PATENT NO.       : 8,675,377 B2  
APPLICATION NO. : 13/383199  
DATED            : March 18, 2014  
INVENTOR(S)      : Thomas et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 170 days.

Signed and Sealed this

Twenty-ninth Day of September, 2015

Michelle K. Lee
*Director of the United States Patent and Trademark Office*